United States Patent [19]
Hsiao et al.

[11] Patent Number: 5,867,890
[45] Date of Patent: Feb. 9, 1999

[54] METHOD FOR MAKING A THIN FILM MERGED MAGNETORESISTIVE READ/ INDUCTIVE WRITE HEAD HAVING A PEDESTAL POLE TIP

[75] Inventors: Richard Hsiao; Cherngye Hwang, both of San Jose; Neil Leslie Robertson, Palo Alto; Hugo Alberto Santini, San Jose, all of Calif.

[73] Assignee: International Business Machines Corporation, Armonk, N.Y.

[21] Appl. No.: 992,026

[22] Filed: Dec. 17, 1997

[51] Int. Cl.⁶ .......................................... G11B 5/42
[52] U.S. Cl. .................................... 29/603.14; 29/603.15; 29/603.18; 216/22; 360/113
[58] Field of Search ........................... 29/603.13, 603.14, 29/603.15, 603.18; 360/113; 216/22, 27, 66, 67; 205/122; 250/492.3, 492.21

[56] References Cited

U.S. PATENT DOCUMENTS

| 4,601,782 | 7/1986 | Bianchi et al. | 156/643 |
|---|---|---|---|
| 4,791,719 | 12/1988 | Kobayashi et al. | 29/603.14 |
| 5,212,609 | 5/1993 | Yuito et al. | 360/113 |
| 5,371,643 | 12/1994 | Yuito et al. | 360/113 |
| 5,438,747 | 8/1995 | Krounbi et al. | 29/603.16 |
| 5,452,164 | 9/1995 | Cole et al. | 360/113 |
| 5,578,342 | 11/1996 | Tran et al. | 427/131 |
| 5,649,351 | 7/1997 | Cole et al. | 29/603.14 |
| 5,751,526 | 12/1998 | Schemmel | 360/113 |

OTHER PUBLICATIONS

R. Hsiao et al., "Gap Protection by Using a Selective Reactive–ion–etching Method", *IBM Technical Disclosure Bulletin*, vol. 38, No. 10, Oct. 1995, p. 487.

M. M. Chen et al., "Self–aligned, Very Narrow Trackwidth Inductive Thin Film Heads for Very High Track Density", *IBM Technical Disclosure Bulletin*, vol. 35, No. 3, Aug. 1992, pp. 157–159.

*Primary Examiner*—Carl E. Hall
*Assistant Examiner*—Davide Caputo
*Attorney, Agent, or Firm*—Thomas R. Berthold

[57] ABSTRACT

A method is described for making a merged thin film read/write head where a common layer serves as both a magnetic shield for the magentoresistive read element and the first pole piece for the inductive write element, and where the first pole piece thus includes a pedestal pole tip portion that extends up from the first pole piece layer. During fabrication a nonmagnetic spacer layer is deposited over the second pole tip and the gap layer, and then reactive ion etching (RIE) removes the spacer layer from the top of the second pole tip and the gap layer not beneath the second pole piece, but leaves the spacer layer on the sidewalls of the second pole tip. The ion bombardment of the RIE process is perpendicular to the gap layer and is continued after removal of the spacer layer to also remove the gap layer in the region not beneath the second pole piece so that the first pole piece layer is exposed. The RIE uses a gas that is more reactive with the gap material than the material of the second pole tip so that the top surface of the second pole tip is not substantially removed during etching of the gap layer. Next, ion milling removes the material from the layer of the first pole piece to form a first pedestal pole tip beneath the gap. Material ejected from the first pole piece layer during ion milling that gets redeposited on the second pole piece is prevented from contacting the sidewalls of the second pole tip because of the spacer layer.

10 Claims, 4 Drawing Sheets

METHOD FOR MAKING A THIN FILM MERGED MAGNETORESISTIVE READ/ INDUCTIVE WRITE HEAD HAVING A PEDESTAL POLE TIP

TECHNICAL FIELD

This invention relates generally to a thin film inductive write head of the type formed by thin film deposition and lithographic patterning techniques on the trailing end of an air-bearing slider used in a magnetic recording disk drive. More particularly, the invention relates to a method for making a merged magnetoresistive (MR) read/inductive write head having a magnetoresistive read element located between first and second magnetic shields and a thin film inductive write element with first and second pole tips spaced by a nonmagnetic gap, where the second magnetic shield for the magnetoresistive read element also serves as the first pole tip for the inductive write element.

BACKGROUND OF THE INVENTION

In a magnetic recording disk drive, data is written by thin film magnetic transducers called "heads", which are supported over a surface of the disk while it is rotated at a high speed. The heads are supported by a thin cushion of air (an "air bearing") produced by the disk's high rotational speed.

A prior art merged magnetoresistive read/inductive write head is shown in the side sectional view of FIG. 1 and the partial end view, as seen from the disk, of FIG. 2. The thin film write head includes bottom and top pole pieces P1 and P2, respectively, that are formed from thin films ("layers") of magnetic material. The pole pieces have a pole tip height dimension commonly called "throat height". In a finished write head, throat height is measured between an air-bearing surface ("ABS"), formed by polishing the tips of the pole pieces, and a zero throat height level ("zero throat level"), where the bottom pole piece P1 and the top pole piece P2 converge at the magnetic recording gap G. A thin film magnetic write head also includes a "pole tip region" which is located between the ABS and the zero throat level, and a "back region" which extends back from the zero throat level to and including a back gap BG. Each pole piece has a pole tip portion in the pole tip region and a back portion in the back region. The pole pieces are connected together at the back gap BG. The pole tips are extensions of the bottom and top pole pieces P1 and P2 of the write head. Each of the pole pieces P1 and P2 transitions to a pole tip in the pole tip region. The pole tips are separated by a gap G, which is a thin layer of insulation material, typically alumina ($Al_2O_3$). The pole tip of the top pole piece P2 is the last element to induce flux into the magnetic layer on the disk; therefore, its width is more important than the width of the pole tip on the bottom pole piece P1. However, it is important for the pole tips to have the same width to minimize stray flux leakage around the gap.

A merged MR head, such as shown in FIGS. 1 and 2, employs an MR read element and an inductive write element in combination. This is accomplished by using the top shield S2 of the MR element as the bottom pole P1 of the write element. A merged MR head has a high capability for either reading or writing. The merged MR head saves processing steps over constructing separate read and write heads because the second shield layer S2 of the MR read head also serves as the bottom pole P1 for the write head, thereby eliminating a fabrication step.

However, merged MR head structures generate significantly large side-fringing fields during recording. These fields are caused by flux leakage from the top pole P2 to the parts of the bottom pole P1 beyond the region defined by P2. The side-fringing fields limit the minimum trackwidth achievable, and therefore limit the upper reach of track density. Consequently, when a track written by the write element of a merged MR head is read by the MR element, the "off-track" performance of the MR element is poor. That is, when the MR element is moved laterally from the center of a track being read, it cannot move far before interference from the fields of the adjacent track begins to interfere with the fields of the track being read.

One solution to the side-fringing problem of the merged MR head is to construct a narrow pedestal pole tip portion PT1b on top of the second shield layer S2, as shown in FIG. 2, with the S2 layer then serving as a wider bottom pole tip element PT1a. Both of these pole tips are the pole tip portion of the bottom pole P1, with the pole tip layer PT1b forming a pedestal on the pole tip element PT1a. The sidewalls of the bottom and top pole tips PT1b and PT2 are substantially vertically aligned and constrained to substantially equal widths by ion beam milling through the top and bottom pole pieces and gap layer G, using P2 as a mask. However, because of shadowing caused by the top pole tip PT2 during this process, there is some outward taper to the bottom pole tip PT1b. In addition, because the ion milling rate of the material of gap layer G is slower than the ion rate of the Ni—Fe material of P1, a much thicker layer of P2 must be used since P2 is to serve as the mask. Also, redeposition of the Ni—Fe material from P1 can occur on the side walls of P2 during the ion milling, which can cause magnetic shorting of the pole tips.

What is needed is process for forming a merged magnetoresistive read/inductive write head that does not require a thicker P2 or removal of material redeposited on the P2 pole tip during the ion milling step that forms the P1 pedestal pole tip.

SUMMARY OF THE INVENTION

The present invention is a method for making a merged thin film read/write head where a common layer serves as both a magnetic shield for the MR read element and the first pole piece for the inductive write element, and where the first pole piece thus includes a pedestal pole tip portion that extends up from the first pole piece layer. During fabrication a nonmagnetic spacer layer is deposited over the second pole tip and the gap layer, and then reactive ion etching (RIE) removes the spacer layer from the top of the second pole tip and the gap layer not beneath the second pole piece, but leaves the spacer layer on the sidewalls of the second pole tip. The ion bombardment of the RIE process is perpendicular to the gap layer and is continued after removal of the spacer layer to also remove the gap layer in the region not beneath the second pole piece so that the first pole piece layer is exposed. The RIE uses a gas that is more reactive with the gap material than the material of the second pole tip so that the top surface of the second pole tip is not substanially removed during etching of the gap layer. Next, ion milling removes the material from the layer of the first pole piece to form a first pedestal pole tip beneath the gap. Material ejected from the first pole piece layer during ion milling that gets redeposited on the second pole piece is prevented from contacting the sidewalls of the second pole tip because of the spacer layer.

For a fuller understanding of the nature and advantages of the present invention, reference should be made to the following detailed description taken together with the accompanying figures.

DETAILED DESCRIPTION OF THE INVENTION

Prior Art

Figure 1:
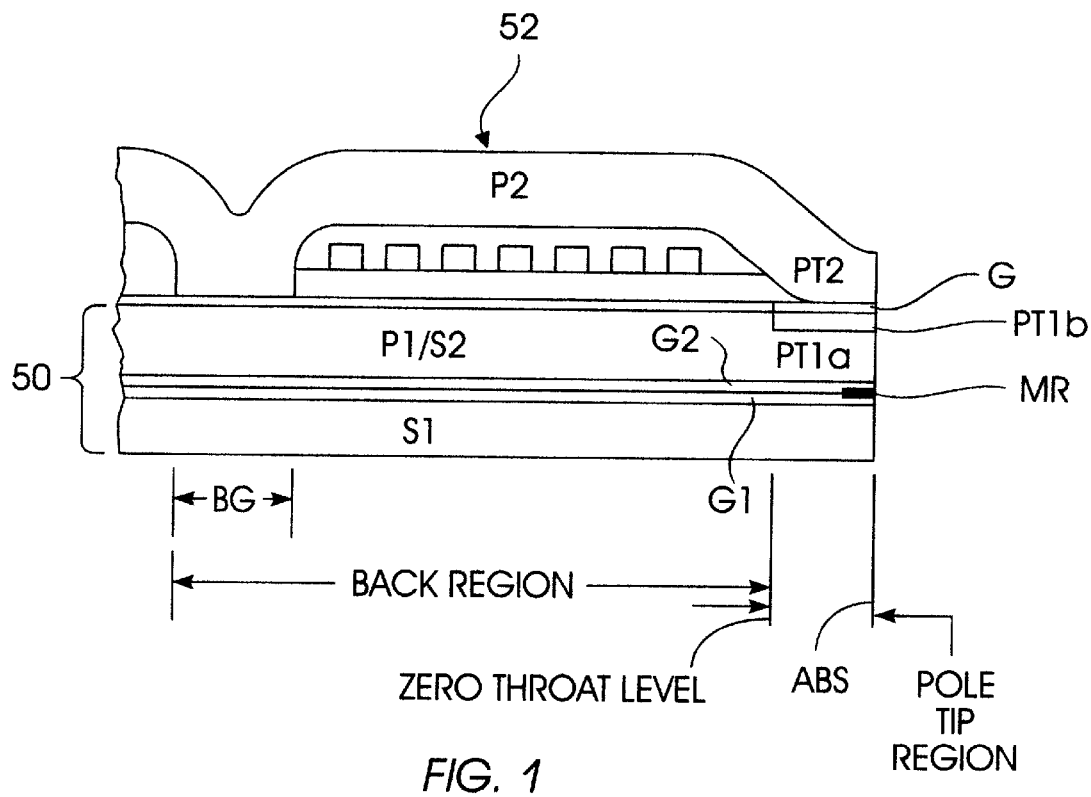
FIG. 1 is a side sectional view of a prior art merged magnetoresistive read/inductive write head.

FIG. 1 illustrates a portion of a merged MR read/inductive write head showing the MR read head 50 and the inductive write head 52. The merged head is mounted on the trailing end of a head carrier, such as an air-bearing slider.

As shown in FIG. 1, the read head 50 includes a magnetoresistive element MR which is sandwiched between first and second gap layers G1 and G2, the gap layers in turn being sandwiched between first and second shield layers S1 and S2. In a merged MR head, the second shield layer S2 of the read head 50 also serves as the bottom pole piece P1 for the write head 52.

As shown in FIG. 1, the write head 52 has a pole tip region which is located between the air-bearing surface (ABS) and a zero throat level and a yoke, or back region, which extends back from the zero throat level to and including a back gap. The write head 52 includes a bottom pole piece P1 and a top pole piece P2. The bottom pole piece P1 comprises the second shield layer S2 of the read head 50. Each pole piece P1 and P2 also has a back layer portion which is located in the back region, the back layer portions of the pole pieces being magnetically connected at the back gap (BG). The bottom pole piece P1 includes a pole tip structure which is located in the pole tip region between the ABS and the zero throat level. This pole tip structure includes a bottom pole tip element PT1a and a top pole tip element PT1b formed as a pedestal above P1. The top pole piece P2 includes a pole tip structure which is located in the pole tip region between the ABS and the zero throat level. This pole tip structure includes a top pole tip element PT2. The pole tip elements PT1a and PT1b are integrally formed from second shield S2 of the read head 50. A pole gap layer (G) is sandwiched between the pole tip elements PT1b and PT2. The desired thickness (gap length) of this layer depends on the desired linear density of the write head. Acceptable gap lengths range from approximately 0.1 $\mu$m to 0.7 $\mu$m. The gap layer G may extend to the back gap BG or, alternatively, may terminate at the zero throat level.

Figure 2:
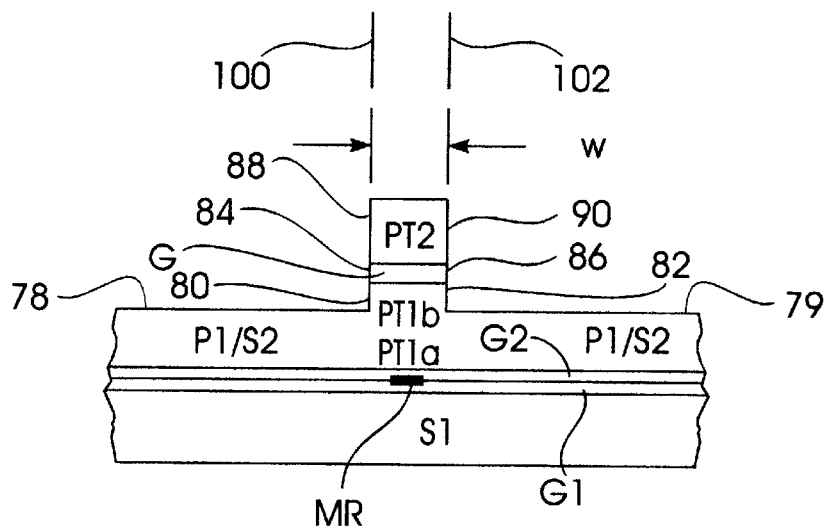
FIG. 2 is a partial end view, as seen from the disk, of the pole tip region of the prior art merged magnetoresistive read/inductive write head shown in FIG. 1.

The bottom pole piece P1 and its pole tip comprise the second shield layer S2 of the MR read head, as shown in FIGS. 1 and 2. One feature of a merged head is that a process step in depositing an extra magnetic layer is eliminated. However, the large width of the second shield layer S2 beyond the sides of the gap G, as illustrated in FIG. 2, causes flux to extend toward the second shield layer S2 beyond the width of the pole tip element PT2. This "side-fringing" flux causes sidewriting which can degrade off-track performance. This problem has been overcome by notching the second shield layer S2 at 78 and 79 on each side of the gap G so as to provide the second shield layer S2 with a pedestal which forms a pole tip element PT1b. Below the pedestal pole tip element PT1b is an area which can be referred to as a pole tip element PT1a. The pole tip elements PT1a and PT1b are forward extensions of the bottom pole piece P1, which comprises the second shield layer S2. The width of the second shield layer S2 is sufficient to effectively shield the MR element of the read head 50. This width can be in the order of 50 $\mu$m, in comparison to a width of approximately 1 $\mu$m for the width of the pole tip elements. The notching 78 and 79 of the second shield layer S2 provides the pedestal pole tip element PT1b with first and second vertical sidewalls 80 and 82. Similarly, the gap layer G has first and second vertical sidewalls 84 and 86. The pole tip element PT2 on top of the gap layer G has first and second vertical sidewalls 88 and 90. The first sidewalls 80, 84, and 88 of the pole tip elements PT1b, the gap G, and the pole tip elements PT2, respectively, lie contiguously in a first vertical plane 100; and the second vertical walls 82, 86, and 90 lie contiguously in a second vertical plane 102. As shown in FIG. 2, the vertical planes 100 and 102 are equally spaced from one another at the ABS to form the trackwidth w of the write head 52. The first and second vertical planes 100 and 102 are also perpendicular to the ABS. The first and second vertical planes 100 and 102 are preferably equally spaced all the way from the ABS to the zero throat level. However, they could diverge from the ABS if desired. The vertical alignments of the sidewalls of the pole tip elements in the first and second vertical planes 100 and 102 are important in combination with the pedestal pole tip PT1b to minimize sidewriting caused by the large lateral width of the second shield layer S2.

DESCRIPTION OF THE PREFERRED EMBODIMENTS

The present invention is an improved process for making the prior art merged head shown in FIGS. 1 and 2, and will be explained with respect to FIGS. 3A–3E.

Figure 3A:
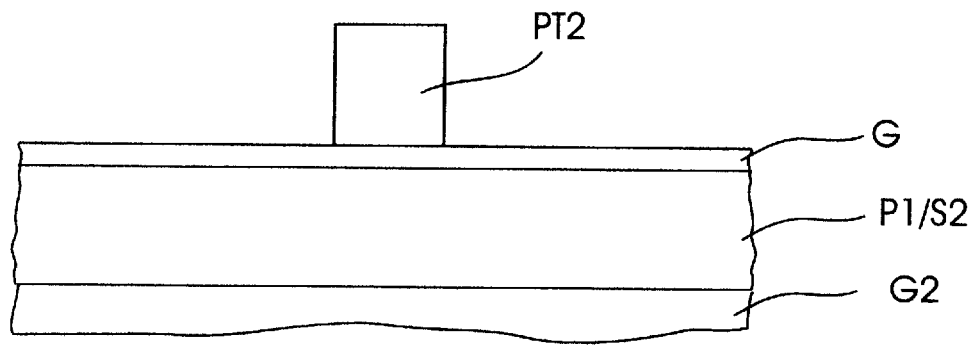
FIGS. 3A–3E are sectional views of the pole tip region of the merged magnetoresistive read/inductive write head during steps in the process of the present invention for fabricating the head.

Referring first to FIG. 3A, a first pole piece P1 formed of ferromagnetic material, typically Ni—Fe, is deposited onto a substrate, typically the G2 layer of the merged head. The first pole piece P1 will be shared with the MR read head as the second shield S2. A layer of insulating material to form gap G is then deposited over the first pole piece P1 layer. The gap material is selected from a set of materials that can be etched much faster than Ni—Fe in the subsequent directional dry-etching process. Examples of the gap materials include $SiO_2$, $Si_3N_4$, $Ta_2O_5$, $Al_2O_3$ and C. After the gap deposition, the insulation/coil stack (not shown in FIG. 3A but depicted in the prior art of FIG. 1) is built and the second pole piece with pole tip PT2 is fabricated on top of the stack.

Figure 3B:
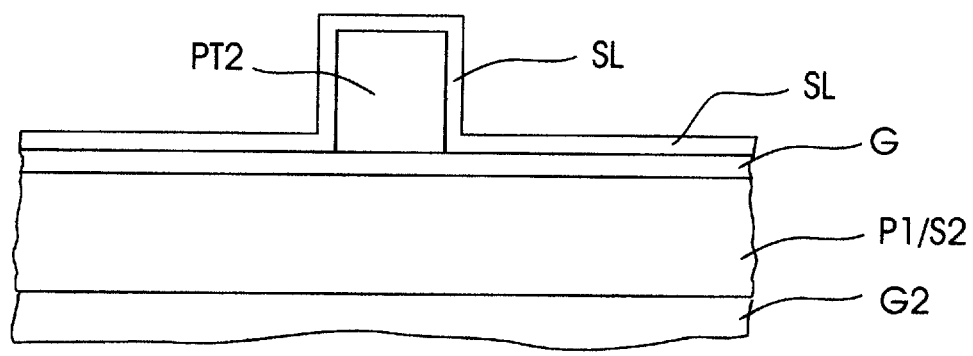

A spacer layer SL is then conformally deposited over the structure, as shown in FIG. 3B. The deposition of the spacer layer can be by RF sputtering or ion beam deposition. The material for the spacer layer can be $SiO_2$, $Si_3N_4$, $Ta_2O_5$ or C. The selection criterion for the material is that the material can be reactive ion etched in a fluorine-containing or oxygen-containing plasma. The thickness of the SL should be in the 200–800 Å range. The head structure after spacer layer SL deposition is shown in FIG. 3B.

Figure 3C:
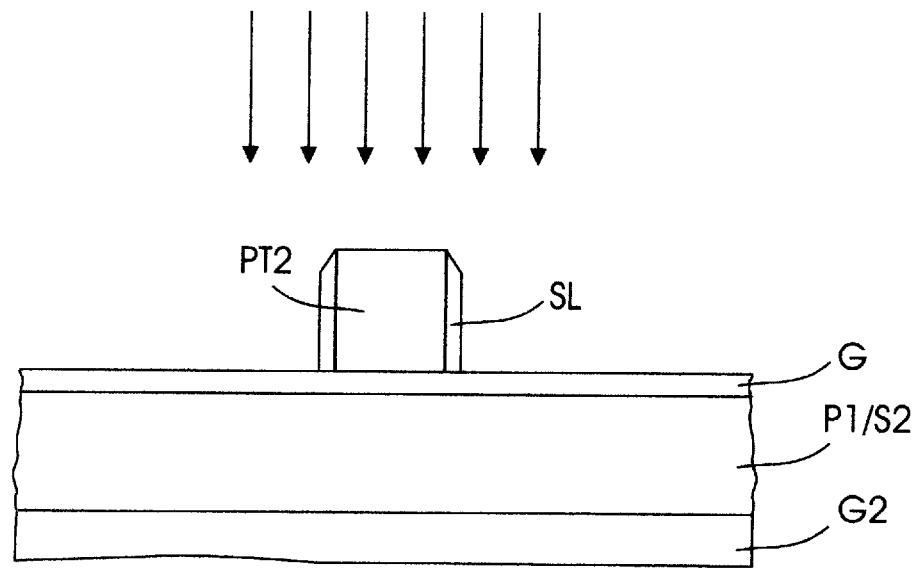

Next, reactive ion etching (RIE) using at least one fluorine-containing gas, such as $SF_6$, $CF_4$, or $CHF_3$, in combination with one or more other gases, such as Ar, $N_2$, or $O_2$, is applied. When C is used, an oxygen-containing gas is used in the RIE process. Since the ion bombardment in the RIE process is applied directionally, as shown by the arrows in FIG. 3C, it removes the spacer layer SL from the horizontal surfaces of the second pole tip PT2 and the gap layer G, but leaves the spacer layer SL essentially intact on the PT2 sidewalls. The direction of the ion bombardment generally perpendicular to the horizontal surface of P1/S2 occurs because the wafer substrate on which the head is fabricated is supported on the cathode, which causes the ions in the plasma to be accelerated toward the horizontal surface plane of the cathode. The structure after the RIE process is shown in FIG. 3C.

Figure 3D:
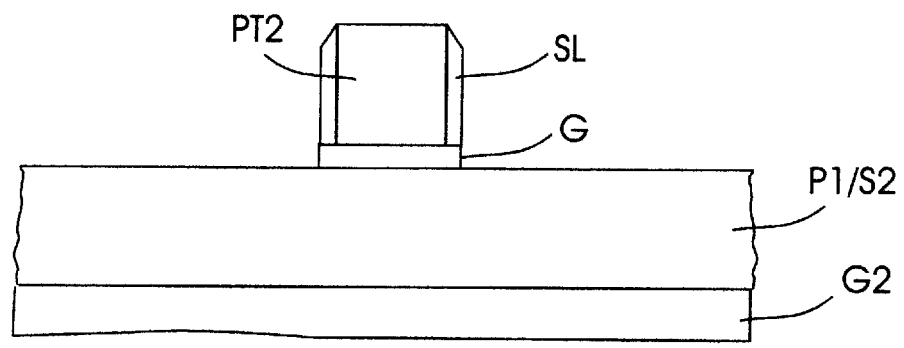

The RIE process then continues until the gap material that is not beneath the second pole tip PT2 is also removed. Again, since the RIE process is directional, gap material beneath the second pole tip PT2 is left intact. The plasma chemistry of the RIE process does not cause significant reactive ion etching of the second pole tip PT2 material, which is usually Ni—Fe. Thus, the second pole tip PT2 will not suffer any significant thickness loss in the dry-etching process. Furthermore, since the reaction products of the RIE process are volatile, no redeposition will occur on the sidewalls of the PT2 pole tip. In the case of an $Al_2O_3$ gap, although the reaction product is not volatile, the formation of Al—F and Ni—F compounds due to the material plasma interaction enhances the $Al_2O_3$ etch rate and suppresses the Ni—Fe etch rate. As a result, a selective $Al_2O_3$/Ni—Fe etching can be achieved and the second pole tip PT2 thickness loss is minimized. If C is used as the gap material then the use of an oxygen-containing plasma in the RIE process accelerates the removal of C because volatile reaction products CO and $CO_2$ are formed and removed. A reactive ion beam etching process can also be used in lieu of the RIE process. The structure after gap etching is shown in FIG. 3D.

Figure 3E:
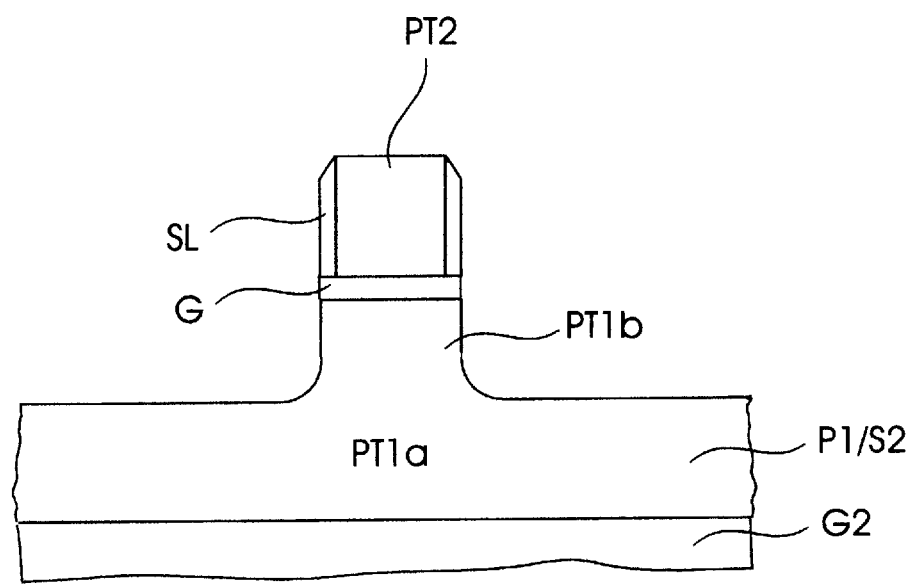

After gap etching, the P1 layer is etched by Ar ion milling to produce a notched P1 using PT2 as the etching mask. This forms the pedestal pole tip PT1$b$ that extends upward from layer P1/S2. The structure after notching the first pole piece layer P1 to form the pedestal pole tip PT1$b$ is shown in FIG. 3E. In this etching step, since the etching mechanism is physical bombardment, the atoms ejected from the P1 surface by etching will accumulate on the vertical sidewalls of PT2. In this case, however, the redeposition will form on the spacer layer SL deposited in the previous step. Since the P1 redeposition material is now separated from the functional PT2 pole tip by the nonmagnetic spacer material SL, the redeposited material will not affect the performance of the write head.

Furthermore, because the redeposition layer is separated from the second pole tip, it will not impede the measurement of the second pole tip trackwidth. Without the spacer layer, since the redeposited material is also metallic, it is difficult to locate the border between the redeposited material and the pole tip PT2 sidewalls, which makes it difficult to measure the trackwidth of the second pole tip.

In addition, now that cleaning of repeposited material is not necessary, the thickness loss of the second pole tip PT2 during etching of the first pole piece P1 layer is minimized, and the possible trackwidth change is avoided. Even if a redeposition cleaning process is applied, the process will only remove the redeposited material and change the thickness of the spacer layer SL without altering the magnetic trackwidth of the second pole tip.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A method for making a thin film inductive write head having first and second pole tips spaced by a nonmagnetic gap comprising:

providing a first layer of ferromagnetic material from which the first pole tip is to be formed;

depositing a layer of nonmagnetic gap material on the first ferromagnetic layer;

depositing on the gap layer a second layer of ferromagnetic material from which the second pole tip is to be formed;

patterning the second ferromagnetic layer to form on the gap layer the second pole tip having sidewalls and a top surface;

depositing a layer of nonmagnetic spacer material over the top surface and sidewalls of the second pole tip and over regions of the gap layer not covered by the second pole tip;

reactive ion etching the spacer layer and the gap layer in said regions to remove the spacer layer and the gap layer from the first ferromagnetic layer in said regions so as to form the nonmagnetic gap beneath the second pole tip, the reactive ion etching using ions directed generally perpendicularly to the gap layer so as to not substantially remove the spacer layer from the sidewalls of the second pole tip, the reactive ion etching including using a gas that is more reactive with the gap material than the second ferromagnetic material so that the ferromagnetic material is not substantially removed from the top surface of the second pole tip during etching of the gap layer; and using the second pole tip as a mask, ion beam milling the first ferromagnetic layer to remove ferromagnetic material in the regions not covered by the gap so as to form the first pole tip below the gap, whereby the spacer layer on the sidewalls of the second pole tip substantially prevents any ferromagnetic material removed from the first ferromagnetic layer during the ion beam milling from contacting the sidewalls of the second pole tip.

2. The method of claim 1 wherein the reactive ion etching comprises reactive ion etching with a fluorine-containing gas.

3. The method of claim 2 wherein the fluorine-containing gas is selected from the group consisting of $SF_6$, $CF_4$, and $CHF_3$.

4. The method of claim 2 wherein depositing the layer of nonmagnetic gap material comprises depositing $Al_2O_3$ and depositing the layer of second ferromagnetic material comprises depositing a Ni—Fe alloy; whereby aluminum-fluorine compounds and nickel-fluorine compounds are formed during the reactive ion etching to thereby enhance the etch rate of $Al_2O_3$ and suppress the etch rate of the Ni—Fe alloy.

5. The method of claim 1 wherein depositing the layer of nonmagnetic gap material comprises depositing C and wherein reactive ion etching comprises reactive ion etching with an oxygen-containing gas.

6. The method of claim 1 wherein depositing a layer of nonmagnetic gap material comprises depositing a material selected from the group consisting of $SiO_2$, $Si_3N_4$, $Ta_2O_5$, $Al_2O_3$ and C.

7. The method of claim 1 wherein depositing the layer of nonmagnetic spacer material comprises depositing material selected from the group consisting of $SiO_2$, $Si_3N_4$, $Ta_2O_5$ and C.

8. A method for making a merged magnetoresistive head having a magnetoresistive read element located between first and second magnetic shields and a thin film inductive write element having first and second pole tips spaced by a nonmagnetic gap, the method comprising:

forming over the magnetoresistive element a first ferromagnetic layer of Ni—Fe alloy to serve as both the second magnetic shield for the magnetoresistive element and the layer from which the first pole tip of the inductive write element is to be formed;

depositing a layer of nonmagnetic gap material comprising $Al_2O_3$ on the first ferromagnetic layer;

depositing on the gap layer a second ferromagnetic layer of Ni—Fe alloy from which the second pole tip of the inductive write element is to be formed;

patterning the second ferromagnetic layer to form on the gap layer the second pole tip having sidewalls and a top surface;

depositing a layer of nonmagnetic spacer material selected from the group consisting of $SiO_2$, $Si_3N_4$, and $Ta_2O_5$ over the top surface and sidewalls of the second pole tip and over regions of the gap layer not covered by the second pole tip;

reactive ion etching with a fluorine-containing gas the spacer layer and the gap layer in said regions to remove the spacer layer and the gap layer from the first ferromagnetic layer in said regions so as to form the nonmagnetic gap beneath the second pole tip, the reactive ion etching using ions directed generally perpendicularly to the gap layer so as to not substantially remove the spacer layer from the sidewalls of the second pole tip, the reactive ion etching causing aluminum-fluorine compounds and nickel-fluorine compounds to be formed to thereby enhance the etch rate of the $Al_2O_3$ in the gap layer and suppress the etch rate of the Ni—Fe alloy in the second pole tip; and using the second pole tip as a mask, ion beam milling the first ferromagnetic layer to remove a portion of ferromagnetic material in the regions not covered by the second pole tip so as to form beneath the gap the first pole tip as a pedestal extending from the first ferromagnetic layer, whereby the spacer layer on the sidewalls of the second pole tip substantially prevents any ferromagnetic material removed from the first ferromagnetic layer during the ion beam milling from contacting the sidewalls of the second pole tip.

9. The method of claim 8 wherein the fluorine-containing gas is selected from the group consisting of $SF_6$, $CF_4$, and $CHF_3$.

10. The method of claim 8 wherein depositing the layer of nonmagnetic spacer material comprises depositing material selected from the group consisting of $SiO_2$, $Si_3N_4$, and $Ta_2O_5$.

* * * * *